United States Patent [19]

Hamaue

[11] Patent Number: 5,261,696
[45] Date of Patent: Nov. 16, 1993

[54] SEAT BELT REACHER

[75] Inventor: Tetsuya Hamaue, Shiga, Japan

[73] Assignee: Takata Corporation, Tokyo, Japan

[21] Appl. No.: 749,239

[22] Filed: Aug. 22, 1991

[30] Foreign Application Priority Data

Aug. 23, 1990 [JP] Japan .................................. 2-222123

[51] Int. Cl.⁵ ........................ B60R 22/02; B60R 22/22
[52] U.S. Cl. .................................... 280/802; 280/808; 280/807; 297/469
[58] Field of Search ............... 280/801, 802, 807, 808; 297/468, 473, 474, 475, 481, 483

[56] References Cited

U.S. PATENT DOCUMENTS

| 4,132,434 | 1/1979 | Takahashi et al. | 280/801 |
|---|---|---|---|
| 4,451,087 | 5/1984 | Tamamushi | 280/801 |
| 4,496,170 | 1/1985 | Sasaki et al. | 280/801 |
| 4,531,762 | 7/1985 | Sasaki et al. | 280/808 |
| 4,635,963 | 1/1987 | Higuchi et al. | 280/801 |
| 4,697,827 | 10/1987 | Sasaki et al. | 280/808 |

FOREIGN PATENT DOCUMENTS

| 2730081 | 1/1979 | Fed. Rep. of Germany | 280/801 |
|---|---|---|---|
| 2822055 | 11/1979 | Fed. Rep. of Germany | 280/802 |
| 3137320 | 4/1983 | Fed. Rep. of Germany | 280/801 |

Primary Examiner—Karin L. Tyson
Attorney, Agent, or Firm—Armstrong, Westerman, Hattori, McLeland & Naughton

[57] ABSTRACT

A seat in an automobile is provided with a spring biased, webbing guiding reach arm actuated by a driving motor so as to set the webbing and tongue of a seat belt at a used position at which they can be handled with ease, and at a retracted position where they will not impede a passenger getting in and out of the seat. Thus, handling of the webbing and tongue is facilitated and a passenger is capable of getting in and out of the seat of the vehicle easily without being impeded by the webbing and tongue.

8 Claims, 6 Drawing Sheets

SEAT BELT REACHER

BACKGROUND OF THE INVENTION

This invention relates to a seat belt reacher for simplifying the handling of a tongue and buckle of a seat belt apparatus when the tongue and the buckle are joined by a seated passenger in order to fasten the seat belt.

In order for a passenger to get in the back seat of a two-door automobile, the passenger opens the front door on, say, the driver's seat side, tilts the back of this seat forward and then enters the automobile from this side and sits down in the back seat. In order to get out of the automobile, the passenger performs the foregoing procedure in reverse, moving forwardly from the back seat and exiting from the vehicle. Consequently, if component parts of a front seat belt apparatus such as a seat-belt retractor and seat-belt anchor are provided at the side of the front seat, these parts impede the movement of the passenger to and from the back seat. Accordingly, these parts are provided at a suitable location in back of the front seat in the prior art.

However, if the retractor and seat-belt anchor are provided in the back of the vehicle in this manner, the tongue of the seat belt also is situated at the back. As a consequence, when a passenger sits down in the front seat and attempts to fasten the seat belt, the passenger must lean backward, grasp the tongue and bring it forward. This is a very troublesome operation.

Accordingly, in the prior art, a service arm for guiding the seat-belt webbing and the tongue is provided. Under ordinary conditions, the service arm is situated forwardly so that the tongue and webbing are held at a position close to the front seat to facilitate handling of the tongue. When the passenger gets into the back seat, the service arm is moved backward to situate the tongue and webbing rearwardly, thereby enabling the passenger to sit down in the back seat without being impeded. In this case, the service arm is mounted on the vehicle body at the side of and above the rear seat.

Ordinarily, the front seat of an automobile is positionally adjustable back and forth so that it can be adapted to the build of the seated passenger. Consequently, in the arrangement in which the service arm is mounted on the vehicle body at the side of and above the rear seat, as mentioned above, the distance between the front seat and the tongue of the seat belt increases when the front seat is adjusted to the forward position, and this has the effect of diminishing the advantage gained by positioning the tongue forward by means of the service arm. Thus, there is a change in the amount of reach necessary at the adjusted position of the seat. As a consequence, even though the service arm is provided, the problem associated with the handling of the tongue remains.

SUMMARY OF THE INVENTION

An object of the present invention is to provide a seat-belt reacher in which tongue handling is simplified regardless of the position to which the seat has been positioned longitudinally of the vehicle, and in which the tongue and webbing can be prevented from impeding a passenger getting in and out of the vehicle.

According to the present invention, the foregoing object is attained by providing a seat-belt reacher comprising webbing guiding means provided at the seat of an automotive vehicle and capable of being set at used position, at which handling of the webbing and tongue of a seat-belt apparatus are facilitated, and a retracted position, at which the webbing guiding means will not impede a passenger getting in and out of the seat, and actuating means for setting the webbing guiding means at the used position and at the retracted position.

The seat-belt reacher according to the present invention is so adapted that when the webbing and tongue are set at the used position by the webbing guiding means, handling of the webbing and tongue is facilitated at fastening of the seat belt. When the webbing and tongue are set at the retracted position, they will not impede a passenger who is getting in and out of the seat. As a result, the passenger is capable of getting in and out of the vehicle with ease.

Furthermore, when the seat is moved back and forth, the webbing guiding means move back and forth along with the seat. Therefore, regardless of the position to which the seat is adjusted longitudinally of the vehicle, handling of the webbing and tongue is simplified and, as a result, fastening of the seat belt also is simplified.

Still other objects and advantages of the invention will in part be obvious and will in part be apparent from the specification. The invention accordingly comprises the features of construction, combinations of elements and arrangement of parts which will be exemplified in the construction hereinafter set forth, and the scope of the invention will be indicated in the claims.

DESCRIPTION OF THE PREFERRED EMBODIMENT

Figure 1:
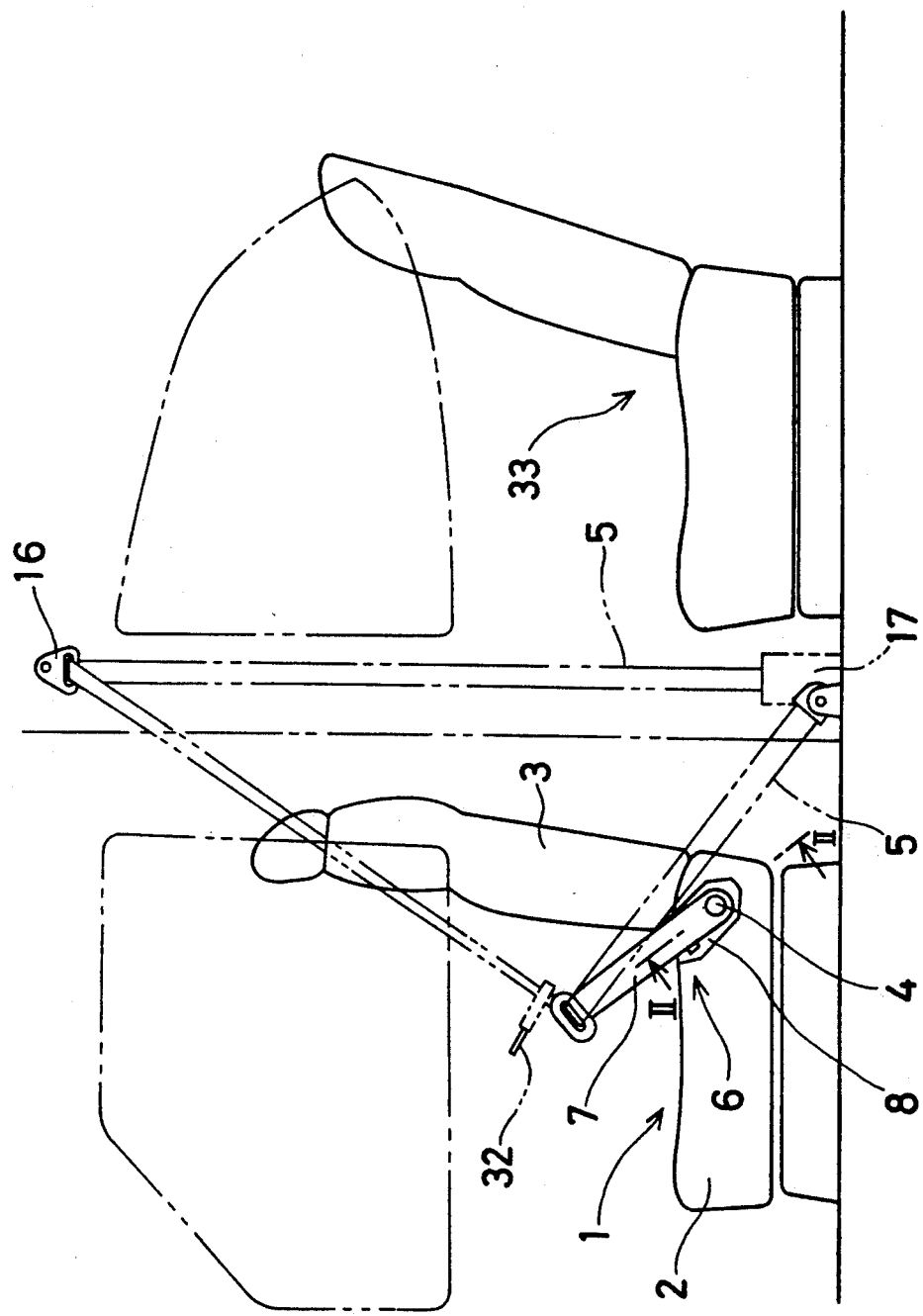
FIG. 1 is a partial view schematically illustrating an embodiment of a seat-belt reacher according to the present invention.

As shown in FIG. 1, a front seat 1 in a two-door automobile comprises a seat portion 2 and a seat back 3. The seat back 3 is capable of being raised and reclined by turning it back and forth about a seat shaft 4. Provided at the side of the front seat 1 is webbing guiding means 6 for guiding a webbing 5 of a seat belt apparatus installed at the front seat 1.

Figure 2:
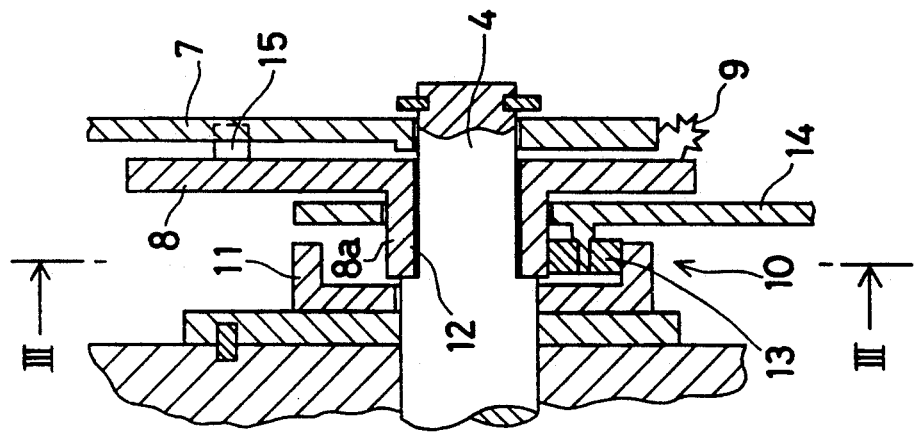
FIG. 2 is a sectional view taken along line II—II of FIG. 1.
Figure 3:
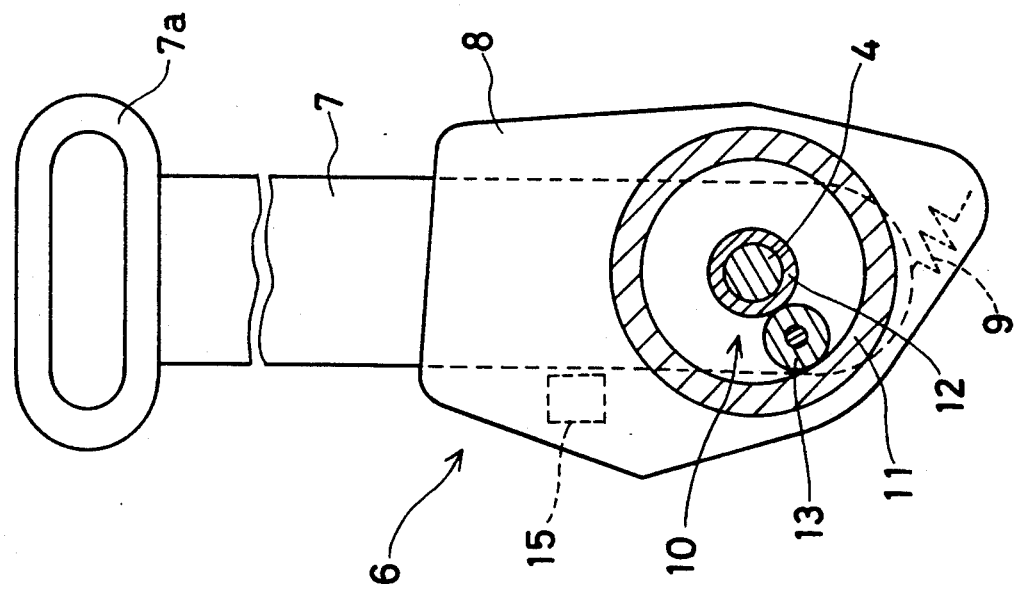
FIG. 3 is a sectional view taken along line III—III of FIG. 2.

As shown in FIGS. 2 and 3, the webbing guiding means 6 comprises a service arm 7 and an arm bracket each of which is provided on the seat shaft so as to be capable of being turned, a tension spring 9 provided between the service arm 7 and the arm bracket 8 for biasing the service arm 7 forwardly at all times, and a planetary gear mechanism 10 provided between the arm bracket 8 and the seat back 3.

The planetary gear mechanism 10 includes an internal gear 11 fixedly secured to the seat back 3 in coaxial relation with the seat shaft 4, a sun gear 12 provided on a cylindrical portion 8a of the arm bracket 8, and an idling gear (planetary gear) 13 meshing with the gears 11, 12. The idling gear 13 is supported on an idling gear plate 14 secured to the vehicle body.

An engaging portion 15 is provided on the arm bracket 8 and is for limiting the turning motion of the service arm 7, relative to the arm bracket 8, which is produced by the biasing force of the tension spring 9. The distal end of the service arm 7 is provided with a guide portion 7a which guides the webbing 5.

As illustrated in FIG. 1, a seat-belt anchor 16 is provided on the vehicle body at a point rearwardly of the front seat 1. Webbing pulling means 17 is provided on the lower portion of the vehicle body at a point below the seat-belt anchor 16. The webbing 5 is passed through the seat-belt anchor 16 to be guided thereby, and one end of the webbing is taken up by the webbing pulling means 17.

Figure 4:
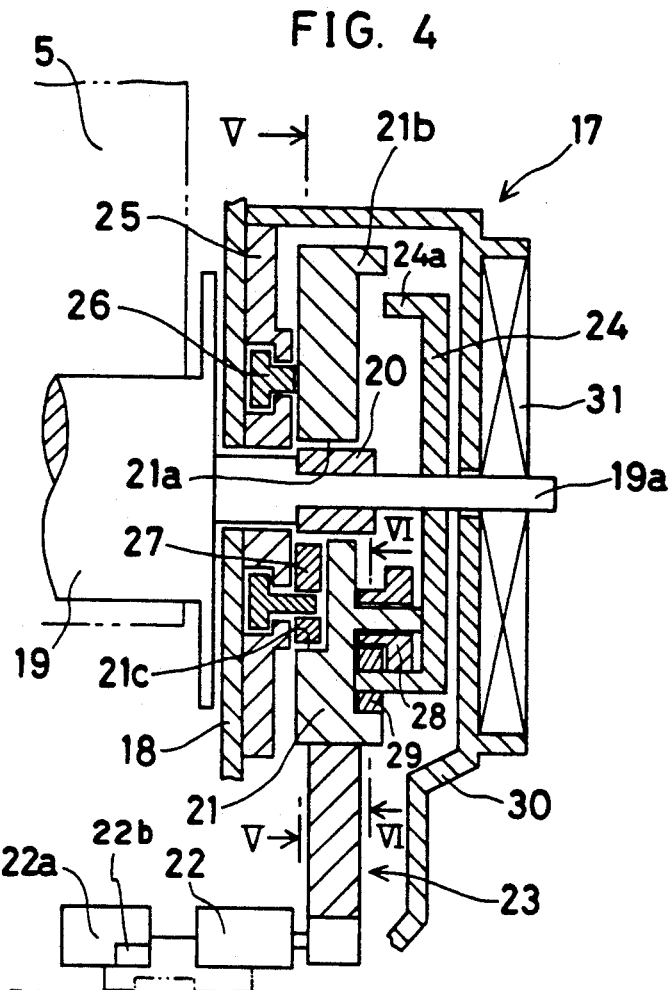
FIG. 4 is a sectional view partially showing webbing pulling means in the illustrated embodiment.

As illustrated in FIG. 4, the webbing pulling means 1 comprises a roll 19 freely turnably supported on a base member 18 for taking up the webbing 5; a shaft gear 20 provided on a shaft 19a of the roller 19; a driver gear 21 which is arranged so as to be turnable relative to the shaft gear 20, and which has a hole 21a in which the shaft gear 20 is situated, and an internal gear 21b; driving means 22, such as a motor, for applying a driving force to the driver gear 21; control means 22a including a driving time setter 22b as schematically shown in FIG. 4 for controlling the driving means 22; a reduction gear mechanism 23 for reducing the driving force of the driving means 22 and transmitting the resulting force to the driver gear 21; a plate gear 24, which is secured to the shaft 19a, having an internal gear 24a; a retainer 25 secured to the base member 18; a friction plate 26 supported so as to slide frictionally on the retainer 25 and so as to turn about the central axis of the shaft 19a; a first hook 27 freely turnably supported on the friction plate 26 and capable of being engaged with and disengaged from the shaft gear 20; an idling gear 28 freely turnably supported on the driver gear 21 and meshed with the internal gear 24a; a second hook 29 turnably supported on the plate gear 24 and capable of being engaged with and disengaged from the internal gear 21b; a cover 30 which covers the gears 20, 21, 23, 24, 28, the hooks 27, 29 and the driving means 22; and a biasing spring 31 provided between the cover 30 and the shaft 19a for constantly biasing the shaft 19a in a direction for taking up the webbing 5.

Figure 5:
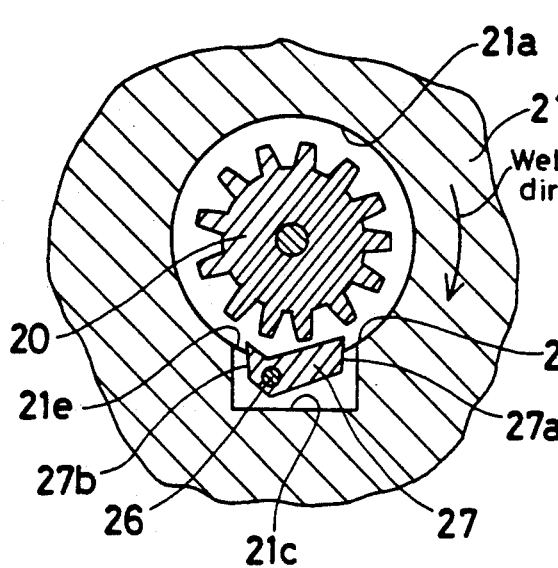
FIG. 5 is a partial sectional view taken along line V—V of FIG. 4.

As will be evident from FIG. 4, the driver gear 21 is formed to have a recess 21c contiguous with the hole 21a. The first hook 27 is disposed within the recess 21c. As depicted in FIG. 5, the recess 21c is generally rectangular and has left and right boundaries with the hole 21a. The boundary on the right side defines a first engaging portion 21d, and the boundary on the left side defines a second engaging portion 21e.

When the driver gear 21 is turned in the direction to take up the webbing 5, the friction plate 26 and the first hook 27 do not turn together with the driver gear 21 owing to the friction between the retainer 25 and the friction plate 26. Accordingly, the first engaging portion 21d abuts against an engagement face 27a of the first hook 27 so that the first hook 27 is turned toward the shaft gear 20 to engage the same. When the driver gear 21 is turned in the direction opposite that for taking up the webbing 5 in a state where the first hook 27 is engaged with the shaft gear 20, the second engaging portion 21e of the driver gear 21 abuts against a second engagement face 27b of the first hook 27 so that the first hook 27 is turned in the direction away from the shaft gear 20, thereby being disengaged from the shaft gear.

Figure 6:
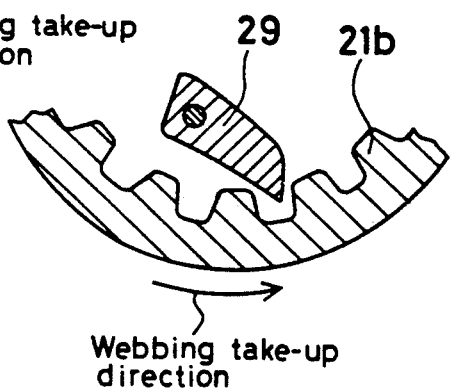
FIG. 6 is a partial sectional view taken along line VI—VI of FIG. 4.

As illustrated in FIG. 6, the second hook 29 does not engage the internal gear 21b during rotation of the driver gear 21 in the direction for taking up the webbing but it does engage the internal gear 21b during rotation of the driver gear 21 in the opposite direction. In such case, the second hook 29 is biased toward the internal gear 21b by the comparatively small force of suitable biasing means (not shown), such as a spring.

The seat-belt reacher according to the illustrated embodiment is constructed by the webbing guiding means 6 and the webbing pulling means 17.

Figure 7:
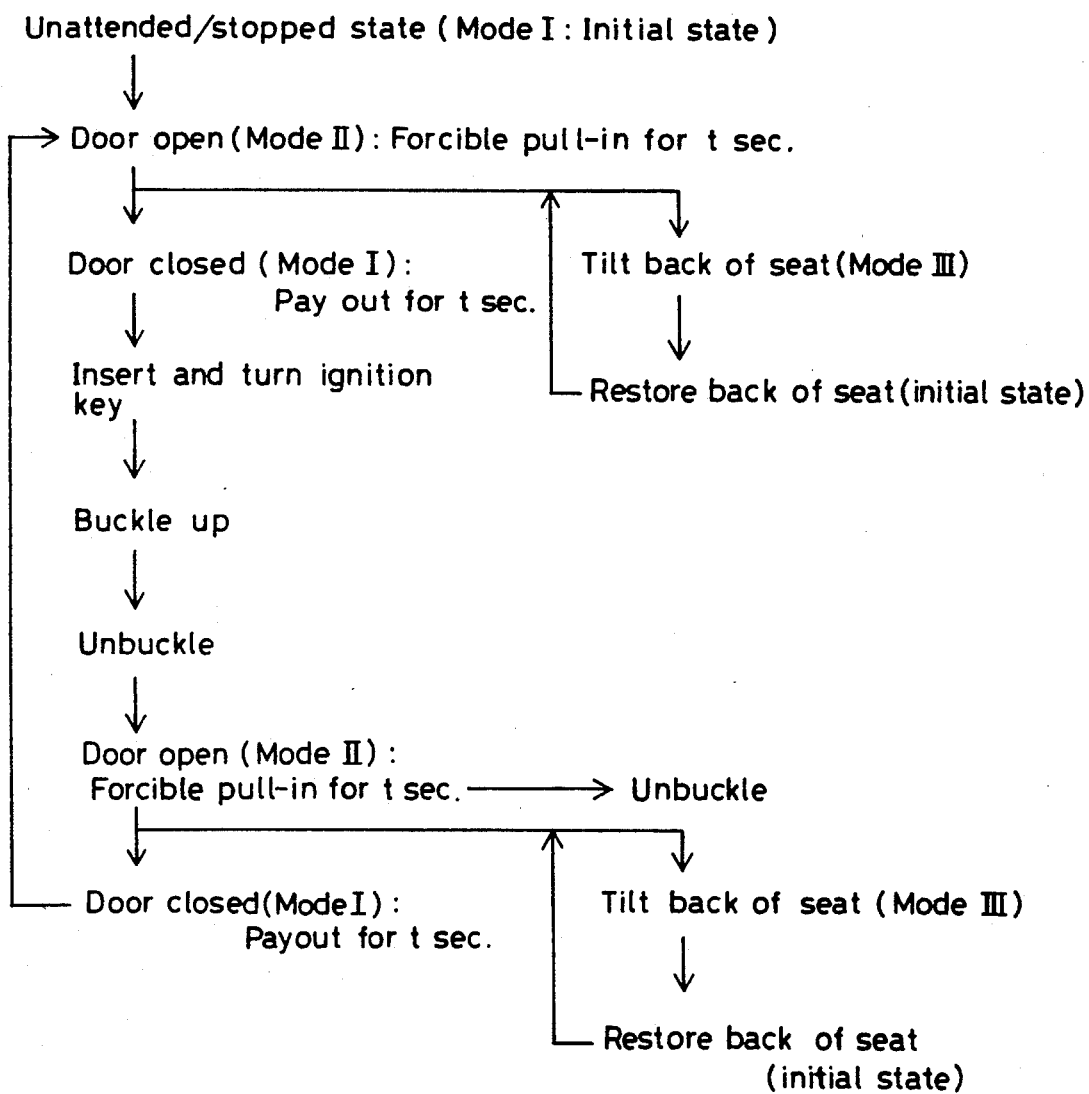
FIG. 7 is a diagram showing the operating flow of the illustrated embodiment.

The operation of the seat-belt reacher thus constructed will now be described based upon the operating flow shown in FIG. 7 and the modes shown in FIG. 8.

Figure 8A:
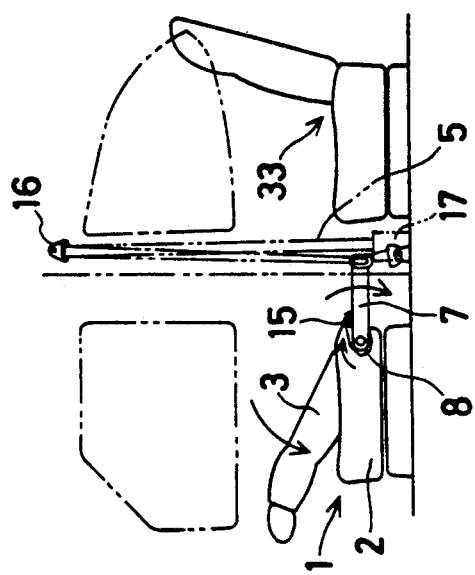
FIGS. 8(a), 8(b) and 8(c) diagrammatically describe modes set in the illustrated embodiment.
Figure 8B:
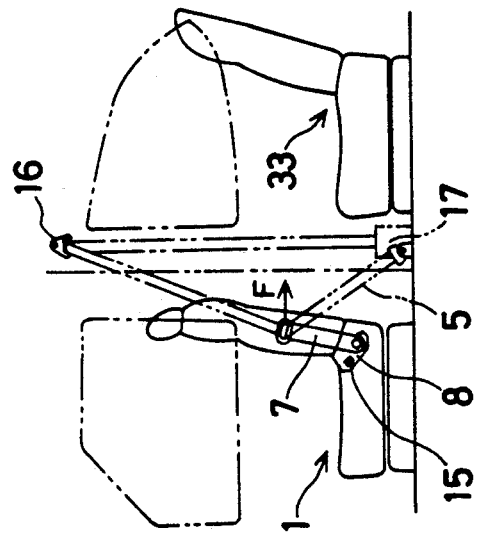

When the automobile is at rest and vacant, the service arm 7 is set in Mode I (initial state), namely an unloaded state, in which it is situated between the seat portion 2 and the seat back 3, as shown in FIG. 8(a). When a passenger opens the door of the automobile in order to get in, the opening of the door is sensed and the control means 22a controls and actuates the driving means 22 for a predetermined time of t seconds in such a manner that the driver gear 21 is turned in the direction for taking up the webbing 5. As a result, the first hook 27 is engaged with the shaft gear 20 so that the driving force of the driver gear 21 is transmitted to the shaft 19a via the first hook 27 and shaft gear 20. As a consequence, the shaft 19a rotates in the direction for taking up the webbing 5 and therefore the roll 19 proceeds to take up the webbing. As a result, the webbing 5 is forcibly pulled in for t seconds. At this time, owing to the force pulling in the webbing 5, a force F acting in a direction against the tension spring 9 is applied to the service arm 7. By setting the pulling force of the driving means 22 in such a manner that the force F becomes larger than the spring force of the tension spring 9, the service arm 7 is turned to the rear to assume an inclined position substantially the same as the inclined position of the seat back 3, as shown in FIG. 8(b). Thus, the service arm 7 is set in Mode II, namely a position at which it will not impede the passenger attempting to sit down in the front seat 1.

Figure 8C:
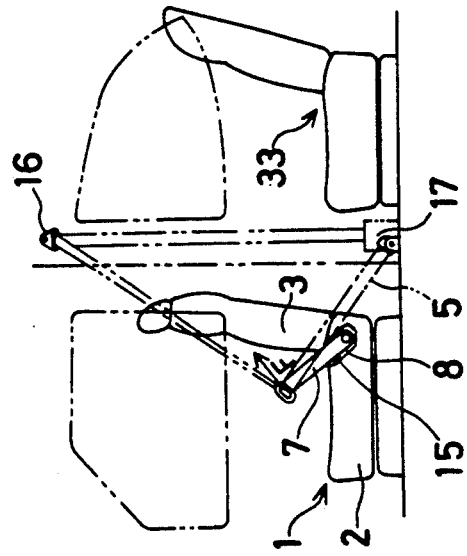

When a passenger sits down in the back seat 33 under these conditions, the seat back 3 of the front seat 1 is tilted forwardly. When this is done, the turning motion of the seat back 3 in the forward direction is speeded up by the planetary gear mechanism 10 and then transmitted to the arm bracket 8, as a result of which the arm bracket 8 is turned rearwardly to assume a substantially horizontal attitude, as shown in FIG. 8(c). When the arm bracket 8 is turned a predetermined amount at this time, the engaging portion 15 engages the service arm 7 that has been set in Mode II. As a consequence, the service arm 7 also is turned rearwardly until it assumes a substantially horizontal attitude along with the arm bracket 8. Accordingly, when a passenger climbs into the back seat 33 from the side of the front seat 1, the arm bracket 8, service arm 7 and webbing 5 move to positions at which they do not obstruct the passenger. This allows the passenger to climb into the back set 33 very easily.

When the passenger has occupied by the back seat 33, the seat back 3 of the front seat 1 is returned to its upright attitude. As the seat back 3 is turned to assume the upright attitude, the arm bracket 8 is turned forwardly, while the motion thereof is speeded up the by planetary gear mechanism 10, until it assumes the position illustrated in FIG. 8(b). Further, owing to the biasing force applied by the tension spring 9, the service arm 7 is turned forwardly in similar fashion until it assumes the position shown in FIG. 8(b). Thus, the service arm 7 is set in Mode II.

Under these conditions, a passenger climbs into the front seat 1. In this case, when Mode II is in effect, the seat back 3 is in its initial state, and therefore the arm bracket 8 also is in its initial state, i.e., in a state similar to that of Mode I. However, since the arm bracket 8 is designed to have a comparatively small length, it will not impede the passenger climbing into the front seat 1. Accordingly, the passenger can climb into the front seat 1 with ease.

When the passenger sits down in the front seat 1 and closes the door, closing of the door is sensed and the control means 22a controls and actuates the driving means 22 for a predetermined time of t seconds in such a manner that the driver gear 21 is turned in the direction opposite that for taking up the webbing 5. As a result, the first hook 27 and the shaft gear 20 disengage and the second hook 29 engages the internal gear 21b so that the shaft 19a and roll 19 are turned in a direction for paying out the webbing 5. As a result, the webbing 5 is paid out forcibly for t seconds and the service arm 7 is set in Mode I. Owing to disengagement between the first hook 27 and shaft gear 20, the webbing 5 can be pulled out by hand when it is paid out.

Next, the ignition key is turned under these conditions to start the engine and the tongue 32 of the seat belt apparatus shown in FIG. 1 is fitted in the buckle (not shown) to fasten the seat belt. In this case, the tongue 32 is in close proximity to the guide portion 7a at the distal end of service arm 7, and therefore the tongue 32 is easy to handle.

When the door is opened after the tongue and buckle have been disconnected in order for the passenger to get out of the back seat, the disconnection and the opening of the door are sensed and the control means 22a controls and actuates the driving means 22 for a predetermined time of t seconds in such a manner that the driver gear 21 is turned in the direction for taking up the webbing 5. As a result, the webbing 5 is forcibly pulled in for t seconds and the service arm 7 is set in Mode II, namely at a position where it will not interfere with the passenger getting out of the vehicle. When the passenger seated in the front seat 1 gets out of the vehicle and then tilts the seat back 3 of the front seat 1 forwardly in order that the passenger seated in the back seat 33 may get out, the arm bracket 8 and service arm 7 turn towards the rear of the vehicle until they assume a substantially horizontal attitude, as shown in FIG. 8(c), just as described above. In other words, the arm bracket 8, service arm 7 and webbing 5 move to positions at which they will not obstruct the passenger getting out of the back seat. This allows the passenger to get out of the vehicle from the back seat 33 with ease.

When the seat back 3 of the front seat 1 is set upright to its original position after the passenger evacuates the back seat 33, the service arm 7 and arm bracket 8 are set in Mode II, just as described above. Then, when the door is closed, the webbing 5 is forcibly paid out for t seconds and the service arm 7 is set in Mode I in a manner similar to that described above.

In the operation described, it goes without saying that if a passenger sits down in the front seat only and the rear seat is unoccupied, the operations associated with the seating of a passenger in the back seat are not carried out.

Figure 9:
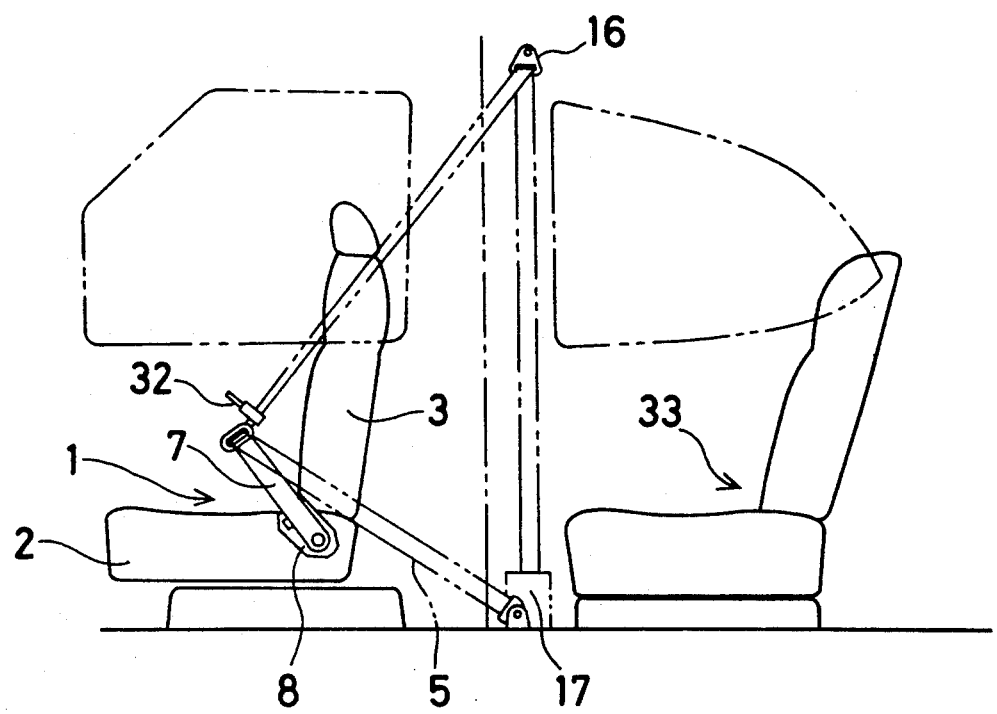
FIG. 9 is a diagram for describing a case where a front seat is adjusted to a forward position.

Though the front seat 1 is capable of being positionally adjusted back and forth in conformity with the build of the passenger, such as the driver, the front seat 1 will be distanced considerably from the seat-belt anchor 16 when it is adjusted to the forward position as shown in FIG. 9. In accordance with this embodiment, however, the service arm 7 moves forwardly with forward movement of the front seat 1, and therefore the tongue 32 provided on the webbing 5 hardly separates from the front seat 1. Accordingly, even though the front seat 1 is adjusted to the forward position, the handling of the tongue 32 and buckle at fastening of the seat belt is simplified.

In the embodiment described above, the pulling in and paying out of the webbing 5 are controlled in accordance with the driving time t of the driving means 22. However, the present invention is not limited to this arrangement. For example, the amount of rotation of the driving means 22 can be detected by an encoder 34 or the like as schematically shown by the two-dot dash line in FIG. 4, and the foregoing control can be performed based upon the amount of rotation.

Further, in the foregoing embodiment, a case is described in which the present invention is applied to a two-door automobile. However, the invention is applicable also to a three-, four- or five-door automobile as well. In such case, the setting of Mode III will not be necessary in the four- and five-door automobiles.

In accordance with the seat-belt reacher according to the present invention, as will be evident from the foregoing description, the webbing and tongue are set at their used positions by the webbing guiding means, thereby facilitating handling of the webbing and tongue when the seat belt is fastened. In addition, by setting the webbing and tongue at their retracted positions, they can be prevented from impeding a passenger getting in and out of the seat of the vehicle.

Furthermore, handling of the webbing and tongue is simplified irrespective of the position to which the seat is adjusted longitudinally of the vehicle. Accordingly, the seat belt can be fastened with ease.

As many apparently widely different embodiments of the present invention can be made without departing from the spirit and scope thereof, it is to be understood that the invention is not limited to the specific embodiments thereof except as defined in the appended claims.

What is claimed is:

1. A seat-belt reacher in a seat-belt apparatus installed at a seat in an automotive vehicle for restraining a passenger on the seat in an emergency, comprising:
a service arm installed on said seat and guiding a webbing and a tongue of said seat-belt apparatus, said service arm being settable to a used position to facilitate handling of the webbing and the tongue and to a retracted position which will not impede the passenger in getting on and off said seat; and
webbing pull-in means for executing pull-in and pay-out operations for said webbing, said webbing pull-in means setting said service arm to said retracted position by said pull-in operation of said webbing and setting said service arm to said used position by said pay-out operation of said webbing.

2. The seat-belt reacher according to claim 1, wherein said seat is a front seat of the automotive vehicle, said retracted position is a first retracted position and said service arm is set at said first retracted position at which the passenger will not be impeded when getting on and off of said front seat of the automotive vehicle, and means for setting said service arm to a second retracted position at which the passenger will not be impeded when getting in and out of a back seat of the automotive vehicle.

3. A seat-belt reacher according to claim 2, wherein said front seat is provided with a seat unit and a seat back rotatably mounted on said seat unit;

said service arm is mounted on said seat unit;

said webbing pull-in means sets said service arm from said used position to said first retracted position by said pull-in operation of said webbing, and sets said service arm from said first retracted position to said used position by said pay-out operation of said webbing;

said service arm is interlocked with said seat back for movement in response to forward and rearward rotation of said seat back; and said service arm is moved from said first retracted position to said second retracted position in response to forward rotation of said seat back and is moved from said second retracted position to said first retracted position in response to rearward rotation of said seat back.

4. The seat-belt reacher according to claim 3, further comprising means for operatively moving said service arm with turning of said seat back in forward and rearward directions, said means comprising a gear mechanism.

5. The seat-belt reacher according to any one of claims 1, 2 or 4, wherein said webbing pull-in means has driving means for performing a webbing pull-in operation and a webbing pay-out operation;

said seat-belt reacher further comprising control means for controlling said driving means in such a manner that the pull-in operation is performed when the tongue and a buckle of the seat-belt apparatus are disconnected and a door of the automobile is opened, and the pay-out operation is performed when the tongue and the buckle are disconnected and the door of the automobile is closed.

6. The seat-belt reacher according to claim 5, wherein said control means controls amount of pull-in and amount of pay-out of the webbing in accordance with driving time of said driving means.

7. The seat-belt reacher according to claim 5, wherein said control means controls amount of pull-in and amount of pay-out of the webbing in accordance with amount of drive of said driving means.

8. The seat-belt reacher according to claim 4, wherein said gear mechanism is a planetary gear mechanism.

* * * * *